United States Patent [19]

Rozenfeld et al.

[11] 4,227,102
[45] Oct. 7, 1980

[54] ELECTRICAL MACHINE WITH CRYOGENIC COOLING

[76] Inventors: Lev M. Rozenfeld, ulitsa Pravdy, 7a, kv. 30; Jury S. Popov, ulitsa Bariernaya, 16, kv. 14; Anatoly G. Korolkov, ulitsa Ivanova, 5, kv. 71, all of Novosibirsk, U.S.S.R.

[21] Appl. No.: 904,430

[22] Filed: May 10, 1978

[51] Int. Cl.$^2$ .............................................. H02K 9/00
[52] U.S. Cl. ..................................................... 310/52
[58] Field of Search ...................... 310/52, 10, 40, 165; 336/DIG. 1

[56] References Cited

U.S. PATENT DOCUMENTS

| | | | |
|---|---|---|---|
| 3,517,231 | 6/1970 | Massar | 310/52 |
| 3,644,766 | 2/1972 | Hughes | 310/165 |
| 3,657,580 | 4/1972 | Doyle | 310/52 |
| 3,740,595 | 6/1973 | Heller | 310/52 |
| 4,017,755 | 4/1977 | Litz | 310/40 |
| 4,063,122 | 12/1977 | Kullmann | 310/10 |
| 4,085,343 | 4/1978 | Hasegawa | 310/52 |

*Primary Examiner*—R. Skudy
*Attorney, Agent, or Firm*—Lackenbach, Lilling & Siegel

[57] ABSTRACT

An electrical machine with cryogenic cooling having a superconducting exciting winding secured to the rotor shaft and accommodated in a cavity in the rotor filled with a coolant. At the places where the superconducting winding is secured to the rotor shaft, there are provided grooves which communicate with a channel for the supply of the coolant, extending along the axis of the shaft at one of its ends, and with a channel for the removal of the coolant, extending along the axis of the shaft at its opposite end. The coolant is removed from the rotor cavity through channels provided at both ends of the rotor shaft. The rotor shaft accounts for an improved thermal protection of the superconducting exciting winding which is cooled only by the liquid phase of the coolant at a temperature of about 4.5 K.

7 Claims, 3 Drawing Figures

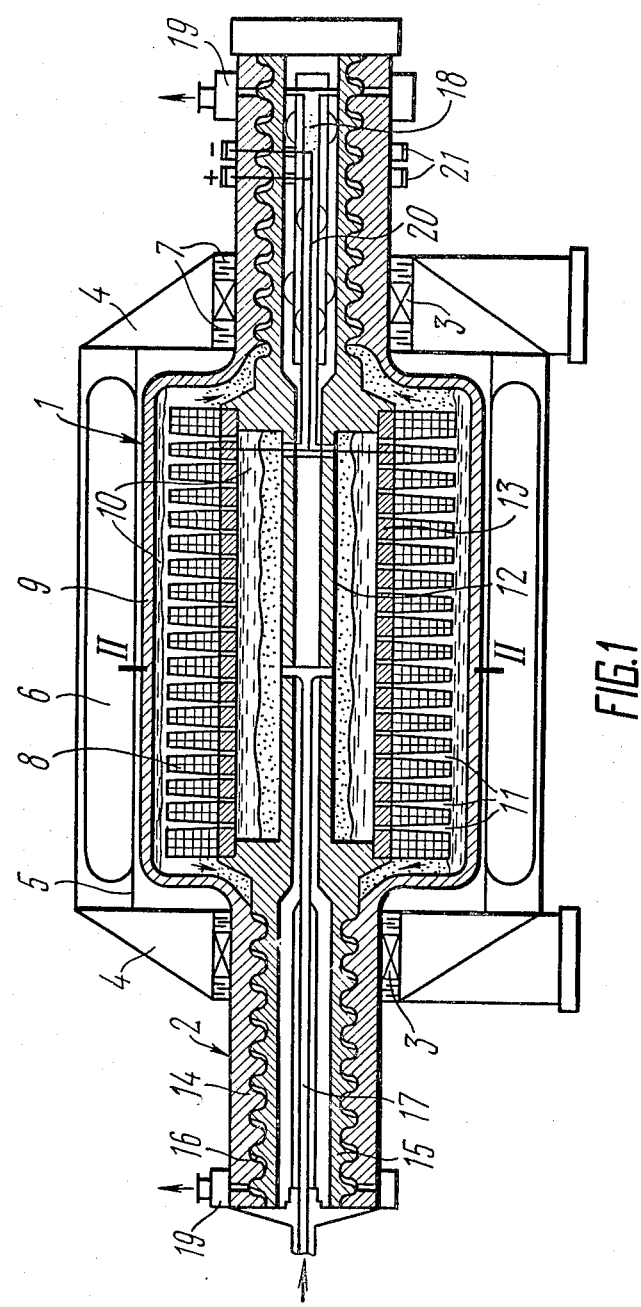

ELECTRICAL MACHINE WITH CRYOGENIC COOLING

FIELD OF THE INVENTION

The present invention relates to electrical machines and, more specifically, to electrical machines with cryogenic cooling.

The invention is applicable to electrical machines, such as motors, generators and dynamotors, employed at atomic, steam and other types of power stations, as well as in the transport and aviation industry. The invention may find extensive application in power units of spacecraft, as well as in all kinds of devices where it is necessary to cool a rotating winding to a superconducting state.

BACKGROUND OF THE INVENTION

Normally, an electrical machine with cryogenic cooling incorporates a superconducting exciting winding secured in a hollow rotor which is a rotary cryostat.

The superconducting state of the exciting winding is maintained by cooling that winding to ultralow temperatures of about 4.5 K. This is done with the aid of a coolant which is usually liquid helium.

The lower the temperature of the superconducting winding (the temperature of the superconductor), the heavier the current and the greater the intensity of the magnetic field the superconducting winding can permit; hence, the higher the efficiency of the electrical machine. An increase in the temperature of the superconducting winding of 1 to 3 degrees results in a considerable drop in the efficiency of the machine.

There are a number of different types of superconducting electrical machines, wherein the superconducting state of the rotary exciting windings is maintained by an immersion of the exciting windings in liquid helium.

There is known an electrical machine with cryogenic cooling, comprising a superconducting exciting winding with busbars connected thereto. The superconducting exciting winding is accommodated in a rotor having a cavity filled with a coolant; the winding is also secured to a shaft of the rotor. The rotor has an axial channel for the supply of the coolant to the superconducting exciting winding, and it is provided at one of the shaft's ends. The rotor shaft is further provided with channels for the removal of the coolant, which extend at both of its ends.

Because the coolant is in a rotating cavity, the liquid helium is subjected to the effects of centrifugal forces. This leads to an increase in the temperature and pressure of the liquid helium, which, in turn, results in the formation of a two-phase mixture of the coolant, and in the increase of the vapor content in that mixture. The higher the peripheral speed of the rotor and the greater its radius, the greater the increase in the temperature and pressure of the liquid helium. An increase in the temperature of the liquid helium and, consequently, in the temperature of the rotary superconducting exciting winding is undesirable because superconductors and superconducting windings manufactured today can perform satisfactorily only at temperature below 5 K.

The machine under review is also disadvantageous in that the temperature of the superconducting winding is determined by the thermal conduction of the contact between the winding and the shaft. The temperature of the superconducting exciting winding increases with an increase in the compressive stress due to the compressive forces exerted by the superconducting winding upon the shaft, which forces are necessary to transmit the torque from the superconducting winding to the drive. The way the superconducting winding is secured in place and cooled makes it hard to ensure a uniform temperature field both surface- and radius-wise. If the internal cavity of the rotor is completely filled with liquid helium it is hard to remove the gaseous phase of the helium from that cavity. There are also heat losses and a rise in the temperature of the coolant, which are due to the friction and compression of the two-phase liquid in the centrifugal force field.

SUMMARY OF THE INVENTION

It is an object of the present invention to provide an electrical machine with cryogenic cooling, featuring a highly effective thermal protection of the superconducting exciting winding and a high efficiency.

The foregoing object is attained by providing an electrical machine with cryogenic cooling, comprising a superconducting exciting winding, whereto there are connected busbars, which superconducting exciting winding is accommodated in a cavity of a rotor, filled with a coolant, and secured on a shaft of the rotor, having an axial channel for the supply of the coolant to the superconducting exciting winding. The axial channel is provided at one of the shaft's ends, and channels for the removal of coolant. Moreover, are provided at both ends of the rotor shaft, the machine is characterized in that the rotor shaft is provided with chambers or grooves extending in parallel with the axis of the shaft at the places where the superconducting winding is secured to the shaft, and throughout the length of the superconducting winding, which grooves communicate with the channel for the supply of coolant, the rotor shaft being further provided with an additional channel for the removal of the coolant, extending along the axis of the shaft at its opposite end and communicating with the grooves.

BRIEF DESCRIPTION OF THE ACCOMPANYING DRAWINGS

These and other objects and advantages of the present invention will become more apparent from the following detailed description of a preferred embodiment when read in conjunction with the accompanying drawings, wherein:

FIG. 1 is an elevation view of an electrical machine with cryogenic made, in accordance with the invention;

DETAILED DESCRIPTION OF THE INVENTION

Figure 3:
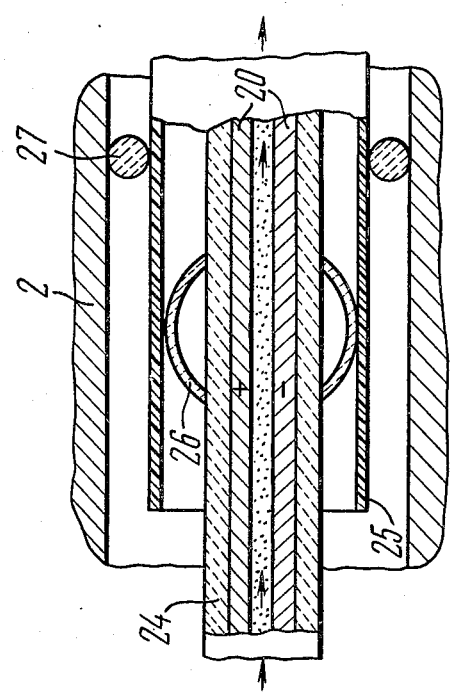
FIG. 3 is an enlarged fragmentary elevation view showing a portion of the additional channel for the removal the coolant, and illustrating the arrangement of the busbars.

According to the invention, the electrical machine with cryogenic cooling comprises a hollow rotor 1 (FIG. 1) having a shaft 2 resting on bearings 3 installed in the end walls 4 of a sealed housing 5. Mounted on the internal surface of the housing 5 is a stator winding 6 (details of the stator winding 6 are not shown).

The rotor 1 is thermally insulated by vacuum in the spacing between the rotor 1 and the sealed housing 5. Vacuum is maintained with the aid of rotary vacuum seals 7 installed in the end walls 4. The hollow rotor 1 has a superconducting exciting winding 8 mounted on the shaft 2 of the rotor 1 and it is accommodated in a shell 9 which forms a cavity of the rotor 1, which cavity is filled with a suitable coolant 10. The exciting winding 8 is manufactured from a material which becomes a superconductor at ultralow temperatures, for example, from niobium-titanium wire stabilized with a matrix of pure copper. The exciting winding 8 is cooled, until it reaches a superconducting state, by the coolant 10 which is liquid helium with a temperature of 4.2 K.

For cooling, the exciting winding 8 is provided with widening radial grooves or channels 11 whose number is only limited by the structural strength of the superconducting exciting winding 8. The superconducting exciting winding 8 is fastened to the shaft 2 in any known manner, for example, with the aid of bandages of glass laminate (the fastening of the winding 8 is shown conventionally). At the places where the exciting winding 8 is secured to the shaft 2 of the rotor 1, the shaft 2 is provided with chambers or grooves 12 which extend parallel to the axis of the rotor 1 and throughout the length of the exciting winding 8. The grooves 12 are covered with segments 13 of a heat-conducting material, for example, bronze. The segments 13 are provided with openings matched with the radial channels 11 of the superconducting exciting winding 8.

The ends of the shaft 2 of the rotor 1 are composed of two coaxial pipes 14 and 15 joined together by a thread whose gaps serve as channels 16 for the removal of the coolant 10. The channels 16 communicate with the cavity of the rotor 1.

To supply the coolant 10 to the exciting winding 8, the shaft 2 of the rotor 1 is provided with an axial channel 17 which is a vacuum-tight pipe extending at one end of the shaft 2.

Extending at the opposite end and along the axis of the shaft 2 of the rotor 1 is a channel 18 for the removal of the coolant 10. Like the channel 17, the channel 18 is a vacuum-tight pipe.

The channel 17 for the supply and the channel 18 for the removal of coolant 10 communicate with the grooves 12. As the coolant 10 leaves the channels 16 and 18, it is caught in gas collectors 19 arranged at the ends of the shaft 2. The exciting winding is energized through busbars 20 made of copper. The busbars 20 are accommodated in the channel 18 for the removal of the coolant 10 and they are connected to collecting rings 21 which rings are mounted on the shaft 2 on the side of the channel 18 for the removal of coolant 10.

Figure 2:
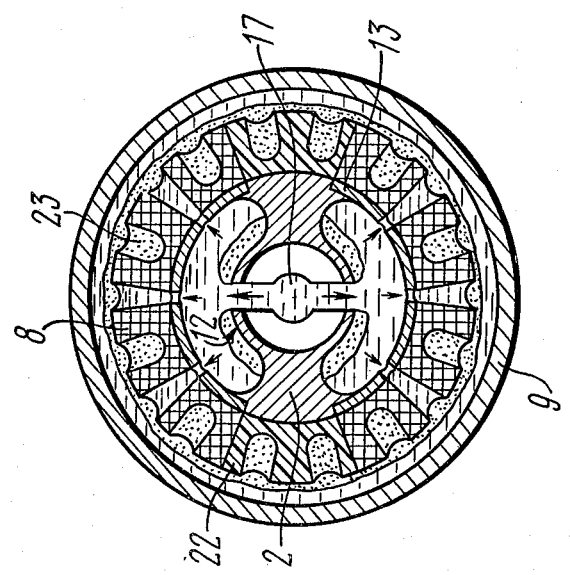
FIG. 2 is an enlarged cross sectional view of the rotor of the electrical machine, taken along the line II—II of FIG. 1.

As shown in FIG. 2, the exciting winding 8 is a bipolar winding composed of two sections. The number of grooves 12 corresponds to that of sections, so in the case under review there are two grooves 12.

In an exciting winding 8 with a different number of poles, grooves are provided under each section of the winding. The width and depth of the grooves 12 depend upon the strength characteristics of the shaft 2.

Interposed between the poles of the exciting winding 8 are inserts 22 (as best shown in FIG. 2) of an electric- and heat-insulating material, for example, micarta.

Provided in the exciting winding 8 (FIG. 1), between the radial channels 11 and in the interpolar inserts 22 (FIG. 2), are longitudinal channels 23 which communicate with the gap between the shell 9 and the exciting winding 8 through radial openings spaced over the entire length of the channel 23.

The channel 18 (FIG. 1) for the removal of coolant 10 is composed of two coaxial pipes 24 and 25 (FIG. 3). Each of the busbars 20 is composed of two copper conductors of different polarities, accommodated in the internal pipe 24. The pipe 24 is arranged in the pipe 25 and rests on arched supports 26 made of an electric- and heat-insulating material. The external pipe 25 is arranged in the axial bore of the shaft 2 and rests on ball supports 27 made of an electric- and heat-insulating material, for example $Al_2O_3$.

In FIGS. 1, 2 and 3, the direction of circulation of coolant 10 is indicated by the reference arrows.

In the proposed electrical machine with cryogenic cooling, the exciting winding 8 (FIG. 1) is cooled as follows.

The coolant 10 (FIG. 1) is liquid helium which is forced under pressure from a refrigerating machine (not shown) through the channel 17 to the cavity of the rotor 1. First, the coolant 10 reaches the grooves 12 of the shaft 2, where the centrifugal forces drive its liquid phase towards the internal surface of the segments 13, whereas the gaseous phase, produced by the centrifugal compression and friction, is driven towards the axis of the shaft 2. The centrifugal forces and pressure drive the liquid phase of the coolant 10 through the openings provided in the radial segments 13 and through the channel 11 of the exciting winding 8 into the internal cavity of the rotor 1. On the internal surface of the shell 9, the coolant 10 is once again divided into a liquid phase and a gaseous phase. The liquid phase remains on the surface of the shell 9, while the gaseous phase proceeds through the radial openings and the longitudinal gas channels 23 (FIG. 2) to the annular gaps formed by the end face of the shell 9 and the exciting winding 8. The gaseous phase thereafter proceeds to the channels 16 for the removal of the coolant at both ends of the shaft 2, and it is collected in the gas collector 19. As this takes place, the gaseous phase of the coolant 10 in the grooves 12 enters the channel 18 for the removal of the coolant, and cools the busbars 20 and it is forced into the gas collectors 19. From these, the coolant is forces to the refrigerating machine (not shown).

The proposed design of an electrical machine provides for an effective cooling of the superconducting winding of the rotor, whereby its temperature is never higher than that of the coolant, keeping in mind that the centrifugal compression in the grooves has no significant effect upon the temperature. The winding cooling system in accordance with the invention makes it possible to use liquid helium under pressure and at a reduced temperature, thus making the thermal protection of the superconducting winding more effective and raising the efficiency of the electrical machine. As a result, the output of an electrical machine according to the invention is 50 percent higher than that of a conventional machine of the same size.

Although the present invention has been described in some detail by way of illustration and example for purposes of clarity of understanding, it will, of course, be undetstood that various changes and modifications may be made in the form, details, and arrangements of the parts withour departing from the scope of the invention as set forth in the following claims.

What is claimed is:

1. An electrical machine witn cryogenic cooling, comprising:

a sealed housing;

a stator winding secured in said sealed housing;

a hollow rotor arranged inside said sealed housing;

a shaft of said hollow rotor;

a superconducting exciting winding secured in said hollow rotor on said shaft of said hollow rotor;

busbars connected to said superconducting exciting winding;

an axial channel for the supply of liquid coolant to said superconducting exciting winding, provided at one end of said shaft and extending along the axis of said shaft;

an additional axial channel for the removal of gaseous coolant, provided at the opposite end of said shaft and extending along the axis of said shaft;

other channels for the removal of gaseous coolant, provided at both ends of said shaft and in communication with the inner cavity of said rotor, and adapted to be connected to gas collectors;

at least two chambers provided on said shaft of said rotor and extending over the entire length of said superconducting exciting winding, parallel with and extending along the axis of said shaft, and communicating with said axial channel for the supply of liquid coolant and with said additional axial channel for the removal of gaseous coolant;

radial channels provided within said exciting winding, and said radial channels arranged to provide communication between said chambers and said cavity of the rotor; and longitudinal channels adapted to remove the gaseous coolant, provided at the outer peripheral surface of said superconducting exciting winding along the entire length thereof, whereby said coolant is continuously separated in the course of its movement toward said sealed housing of said rotor and the temperature of said superconducting exciting winding is substantially more stablized.

2. An electrical machine with cryogenic cooling as claimed in claim 1, wherein said busbars are accommodated in said additional axial channel for the removal of gaseous coolant, extending along the axis of said shaft so as to be cooled with the waste gaseous coolant.

3. An electrical machine with cryogenic cooling as claimed in claim 1, wherein said chambers are covered with segments of a heat-conducting material, and said segments are provided with openings coinciding with said radial channels in said exciting winding.

4. An electrical machine with cryogenic cooling as claimed in claim 1, wherein said chambers correspond in number to the number of poles of said superconducting exciting winding.

5. An electrical machine with cryogenic cooling as claimed in claim 1, wherein said superconducting exciting winding is a bipolar winding comprising two sections and said chambers comprise a pair of opposite disposed chambers with passage means in said shaft for delivering said liquid coolant to and discharging said gaseous coolant from said chambers.

6. An electrical machine with cryogenic cooling according to claims 4 or 5, including insulating inserts interposed between the poles of said superconducting exciting winding.

7. An electrical machine with cryogenic cooling as claimed in claim 1, wherein said axial channel and said additional axial channel are formed by vacuum type coaxial pipes extending from opposite ends of said shaft, and the ends of said shaft are composed of two additional coaxial pipes joined together by a thread forming therebetween said other channels for the removal of said gaseous coolant at opposite ends of said shaft.

* * * * *